United States Patent [19]

Gossner et al.

[11] Patent Number: 5,046,530

[45] Date of Patent: Sep. 10, 1991

[54] FORCE-BALANCED LIFTING VALVE

[75] Inventors: Matthias Gossner, Malente; Joachim Trenkmann, Kiel/Ellerbek; Lutz Bungeroth, Oldenburg/Holstein; Uwe Thomsen, Malente; Peter Leu, Dendendorf, all of Fed. Rep. of Germany

[73] Assignee: H. Kuhnke GmbH KG, Malente, Fed. Rep. of Germany

[21] Appl. No.: 468,749

[22] Filed: Jan. 24, 1990

[30] Foreign Application Priority Data

Jan. 28, 1989 [DE] Fed. Rep. of Germany ....... 8900960

[51] Int. Cl.$^5$ .................. F15B 13/044; F16K 31/06; F16K 39/02; F16K 41/00
[52] U.S. Cl. .......................... 137/596.17; 137/625.65; 251/129.07; 251/282
[58] Field of Search ............... 137/596.17, 625.65; 251/129.07, 282

[56] References Cited

U.S. PATENT DOCUMENTS

| 2,543,010 | 2/1951 | Gardner | 251/129.07 |
| 3,214,134 | 10/1965 | Noakes | 251/282 |
| 3,303,854 | 2/1967 | Churchill | 137/625.65 |
| 3,396,751 | 8/1968 | Bender | 251/282 X |
| 3,635,247 | 1/1972 | Myers . | |
| 3,800,832 | 4/1974 | Umphenour et al. | 251/282 X |
| 3,809,125 | 5/1974 | Machek | 251/282 X |
| 4,582,294 | 4/1986 | Fargo | 251/282 X |
| 4,595,170 | 6/1986 | Livet | 251/129.07 X |
| 4,598,736 | 7/1986 | Chorkey | 251/129.07 X |
| 4,647,008 | 3/1987 | Shirai et al. | 251/129.07 |
| 4,821,774 | 4/1989 | Chorkey | 251/129.07 X |
| 4,852,853 | 8/1989 | Toshio | 251/129.07 |

FOREIGN PATENT DOCUMENTS

| 1025692 | 3/1958 | Fed. Rep. of Germany | 251/282 |
| 1025693 | 3/1958 | Fed. Rep. of Germany | 251/282 |
| 1084537 | 6/1960 | Fed. Rep. of Germany . | |
| 1082785 | 8/1960 | Fed. Rep. of Germany . | |
| 2045929 | 8/1974 | Fed. Rep. of Germany . | |
| 2903296 | 7/1980 | Fed. Rep. of Germany . | |
| 1193773 | 11/1959 | France . | |
| 2171342 | 9/1973 | France . | |
| 2164423 | 3/1986 | United Kingdom . | |

Primary Examiner—Gerald A. Michalsky
Attorney, Agent, or Firm—Dvorak and Traub

[57] ABSTRACT

A force-balanced lifting valve for the control of a fluid, comprises a housing having paths for the fluid, an axially movable component in the form of a valve body provided on a shaft mounted so as to be axially movable in the housing, for the opening and closing a valve opening, and a sealing structure for sealing the axially movable component with respect to the housing. The valve body has associated therewith a force-balancing compensation area, which can be acted upon by pressure fluid by way of a subsidiary channel. The sealing structure comprises an elastic, axially effective sealing ring which sealingly engages the valve housing and the axially movable valve component, such that a radial portion of the ring rests axially and sealingly against at least one abutment shoulder on the axially movable valve component.

12 Claims, 7 Drawing Sheets

FORCE-BALANCED LIFTING VALVE

FIELD OF THE INVENTION

The invention relates to a force-balanced lifting valve for the control of fluids, comprising: a housing defining flow paths for the fluid; a valve body device provided on shaft means mounted for axial movement in the housing, for opening and closing at least one valve opening; and sealing means for sealing off the axially movable components of the valve with respect to the housing.

BACKGROUND OF THE INVENTION

There is disclosed in DE-B-2 045 929, a multipath lifting valve of the type outlined above, which is operated by electrical drive means and which is only force-balanced in its end positions, that is to say in its closure positions, but not in its intermediate positions, so that in these positions, the valve consumes increased electrical power, in order to ensure its reliable operation because of the unbalanced force relationship. Also, the ring seals which are necessarily provided between the valve shaft and the housing of the valve, produce relatively high frictional resistance between these components, which also adds to the power consumed by the drive means, a significant disadvantage in miniature valves. Further, the through-flow capacity of the valve is relative small, since the valve can only be operated under limited pressure and with limited flow cross-sections.

A further force-balanced lifting valve is described in the GB-A-2 164 423. This valve has only an open-shut facility in respect of a single valve opening, and its closure position is force-balanced by means of a piston, which is acted upon by the pressure fluid against a valve disc. A force acts on the force-balancing piston of the valve in the open position of the valve disc, so that correspondingly high power is required of the valve drive means, in order to keep the valve in its open position. Also, because complicated subsidiary flow paths are provided in the valve disc for the pressure fluid flowing to the balancing piston, the cost of manufacturing the valve disc is substantial.

DE-B-1 082 785 discloses a further force-balanced lifting valve having only a single valve opening, and which is force-balanced in its two end positions. The overall design and in particular the construction of its valve body render it unsuitable for use in installations with miniaturised switching components.

SUMMARY OF THE INVENTION

An object of the invention is to provide a lifting valve which is force-balanced in all its positions, which is of substantially reduced size by virtue of its construction, which has a considerably increased fluid through-flow performance, a short stroke, and which requires substantially reduced actuating power.

To these ends the effective surface of the valve body device which is exposed to the fluid pressure has associated therewith a force-balanced compensation surface, which can be acted upon by fluid by way of a subsidiary channel, the sealing means being so constructed and arranged that an elastic, axially effective sealing ring engages on the one hand in a sealing and/or a force-locking manner with the valve housing and on the other hand with the axially movable valve component, such that a radial section of the ring rests in an axially sealing manner against at least one abutting shoulder of the axially movable valve component.

A lifting valve according to the invention, which is of simple construction, is force-balanced in all positions of its valve body or bodies and, also comprises valve shaft means mounted in a substantially friction-free manner and carrying the valve body or bodies, so that considerably reduced driving power is needed to drive the shaft means. The through-flow cross-sections of the valve can be suitably large, the valve body having a short stroke length and the valve having a substantially increased fluid through-flow performance, although being of substantially reduced size. By virtue of its construction the valve can be operated within a desirably wide pressure range, for example from a vacuum up to 16 bar and, if applicable, higher pressures without the power needed to drive the valve being increased.

In a preferred embodiment of the invention the sealing means comprise an annular flat seal and two annular grooves disposed opposite to each other substantially in a common radial plane, in the associated valve shaft and in the housing, the flat seal extending loosely into the two annular grooves, thereby to achieve with a very simple construction, friction-free sealing of the axially movable valve components with respect to the valve housing.

DETAILED DESCRIPTION OF THE INVENTION

Figure 1:
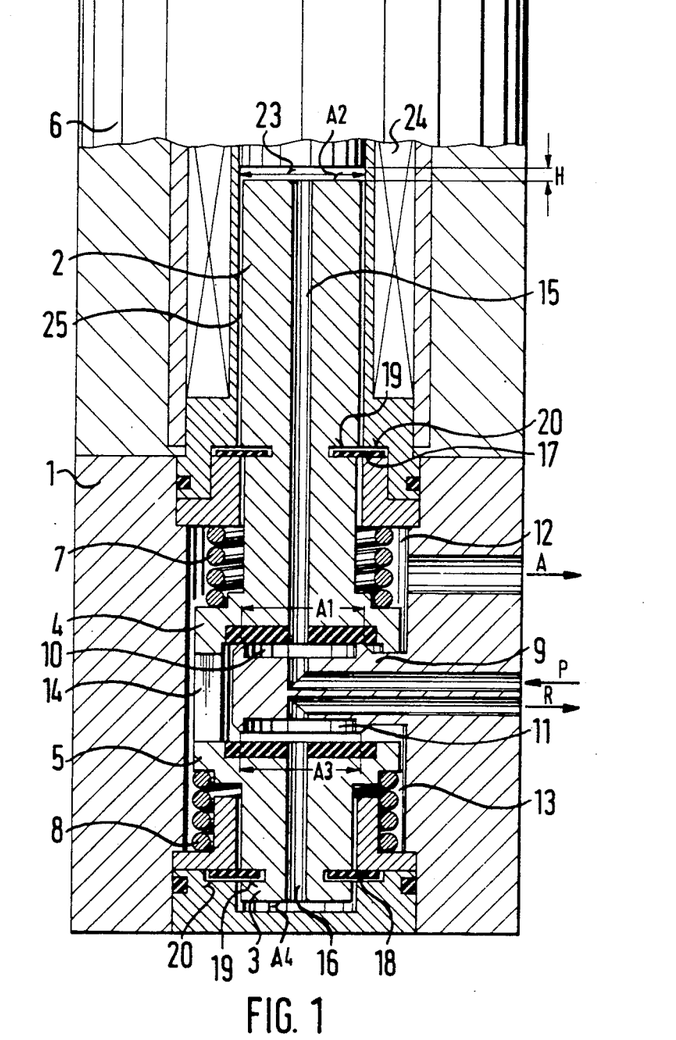
FIGS. 1 and 2 are elevational views shown mainly in axial section of a first embodiment of a lifting valve according to the invention, illustrating respective end positions thereof.
Figure 2:
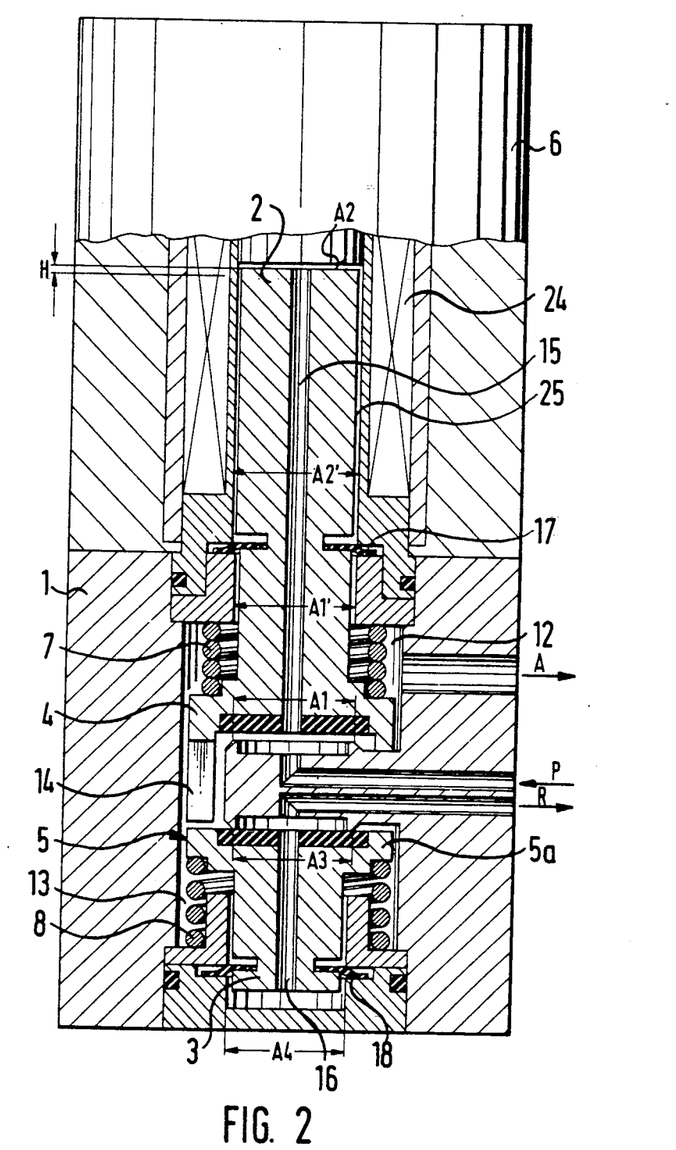

The lifting valve of FIGS. 1 and 2 consists principally of a housing 1, two valve shafts 2 and 3 mounted therein so as to be movable axially in the same direction, with valve bodies 4 and 5 respectively, a conventional electromagnetic drive 6, the armature of which partly comprises the body 4; two spiral compression springs 7 and 8 urging the valve bodies 4 and 5 towards their closure position in which the force of the spring 7 exceeds that of the spring 8 (FIG. 1); and several fluid connection flow paths in the form of conduits P, A and R. By way of an inner projection 9 of the housing 1, having valve openings 10 and 11 for the valve bodies 4 and 5,, and into which the conduits P and R lead, the interior of the housing 1 is effectively subdivided into upper and lower chambers 12 and 13, respectively, which are axially opposite to each other. The valve bodies 4 and 5 are spaced from each other by circumferentially distributed rod-shaped spacing means 14, so that the lower valve body 5 is held in its open position, when the upper valve body 4 is in its closure position, as shown in FIG. 1. The spacing means 14 are secured, in the present example, to the upper valve body 4 and lift off from the lower valve body 5 when the latter is in its closure position, as shown in FIG. 2. It is thereby ensured that taking into account the tolerances obtaining during the manufacture of the lifting valve, the lower valve body 5 is certain to close, when the upper valve body 4 has moved through its full stroke to reach its open position.

Figure 4:
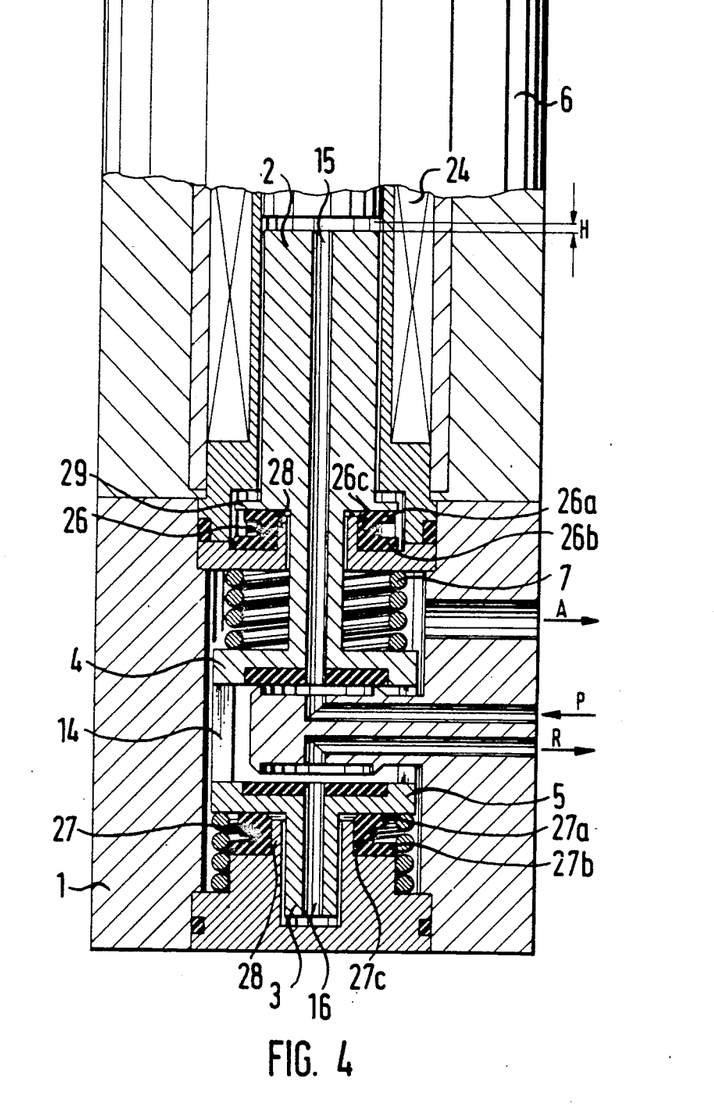
FIGS. 4 and 5 are similar views to those of FIGS. 1 and 2 but illustrating a second embodiment of the invention.

The valve body 4 and the valve shaft 2, are provided with a central subsidiary channel 15, the valve body 5 and the shaft 3 being provided with a central subsidiary channel 16, these channels connecting each valve opening 10 and 11 with the respective reverse side of the valve shaft, so that pressure fluid can reach such reverse side, as will be clearly apparent for example from FIGS. 1 and 4.

Figure 3:
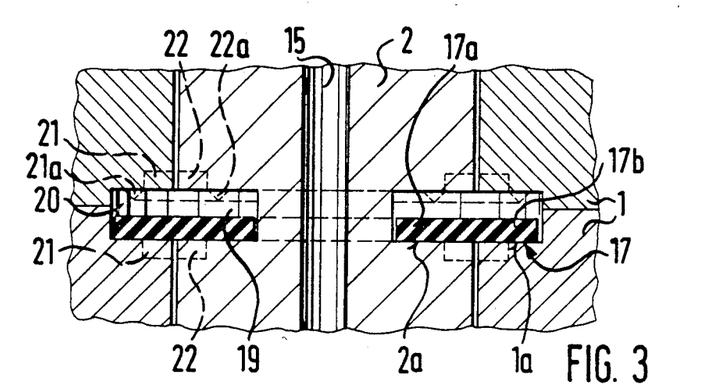
FIG. 3 is an enlarged fragmentary view illustrating details of FIG. 1.

The valve shafts 2 and 3 are sealed in fluid-tight fashion with respect to the housing 1 by means of annular flat seals 17 and 18, respectively, of elastic material and so as to be substantially friction-free. To this end, as shown in FIGS. 1, 2 and 3. pairs of radial annular grooves 19 and 20 are provided in a common radial plane in each valve shaft and in corresponding components of the housing, whereby the seals 17 and 18, in each case extend into both grooves of the respective pair. According to a modification, the annular grooves 19 and 20 may be provided towards their open ends with small annular recesses 21 and 22, which are indicated in broken lines in FIG. 3, the common width of each of which is smaller than the width of the respective flat seal 17 or 18, respectively. Several sealing edges are provided thereby to increase the sealing effect.

In order to force-balance the valve body 4 both in its two end positions (the closure position and the open position) and also in any desired intermediate position, the effective cross-sectional area A1 of the valve opening 10 is opposed by a compensation area A2 of identical size, this being achieved by way of the subsidiary channel 15 by means of the pressure fluid, according to the diameter of the bore 23, in which the shaft 2 is axially movable with sufficient annular clearance 25. Similarly, in the case of the lower valve body 5 or valve shaft 3; the effective area A3 of the valve opening 11, by means of which the valve body 5 is loaded, is opposed by a compensation area A4 of identical size at the other end of the valve shaft 3.

In the position of FIG. 1, the solenoid coil 24 of the drive 6 is currentless, so that the valve body 4 is in its closure position under the action of the spring 7, and against the action of the fluid pressure in the conduit P. By way of the subsidiary channel 15, the pressure fluid likewise acts with the same pressure against the area A2 and by way of the annular clearance 25, against the upper side of the flat seal 17, which thereby seals the chamber 12 therebeneath. The chambers 12 and 13, which communicate with each other, are relieved of air by way of the conduit R. The lower valve body 5 is in its open position against the action of the spring 8.

In the position of FIG. 2 the solenoid coil 24 of the drive 6 energized so that the valve shaft 2 is raised by stroke length H whereby the valve body 4 is placed in its open position, so that the operating fluid is supplied to the conduit A by way of the upper chamber 12. Since the areas A1' and A2' are of identical size with regard to their content, the valve shaft 2 with the valve body 4 is relieved of pressure so that the force exerted by the coil 24 need only overcome the force of the spring 7. The lower chamber 13 also contains fluid at the pressure in the conduit P, the valve shaft 3 in the chamber 13, with the valve body 5 being in its closure position by virtue of the force of the spring 8, because flange 5a of the valve body 5 is likewise force-balanced. The areas A3 and A4 are rendered pressureless by way of the air evacuation conduit R and the subsidiary channel 16, so that a balance of forces also prevails in this region.

As further shown in FIG. 2 the annular flat seals 17 and 18, which lie loosely in their seats, are partially axially deformed through the stroke length H whilst maintaining their sealing abutment against the valve shafts and the corresponding housing components. As will be apparent from FIG. 2, the flat seals 17 and 18 produce no friction between the valve shafts and the housing components opposite thereto. Less electric power is, therefore, needed for energizing the coil 24, whereby the lifting valve is economical of electrical energy and can readily be miniaturised.

Lifting valves have the advantage of a large outflow cross-section relative to the stroke length. In the present invention for example, by virtue of the balance of forces of the valve bodies in all positions, the substantially friction-free axial movement of the valve shafts, the large inflow cross-sections of the flow paths of the conduits P, A and R and the facility to use increased fluid pressure, the fluid through-flow performance of the valve is considerably enhanced. Also, the overall structural dimensions of the valve as regards height, width and depth can be minimised, by approximately 70%, for example.

FIGS. 4 to 7 illustrate different examples of the sealing means, the valve being otherwise identical with that described above. The same reference numerals in those figures, therefore, designate the same parts as those described above.

Figure 5:
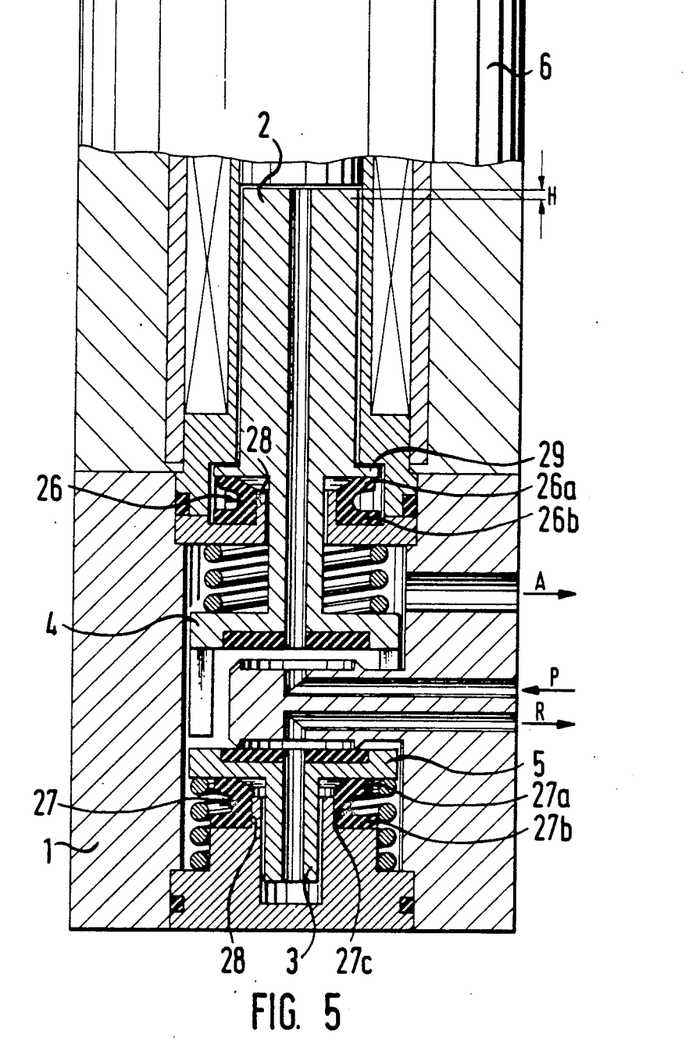

According to FIGS. 4 to 7, the sealing means comprises two elastic, U-shaped sealing rings 26 and 27, each having a radially directed open side. In FIGS. 4 and 5 said open side is directed radially outwards, and is exposed to the higher fluid force, so that in each case the upper and lower shanks 26a and 26b or 27a and 27b respectively of the sealing ring are urged apart. Moreover, the seal in each case comprises an annular, axially projecting supporting collar 28 of the housing 1, against which the cross-piece member 26c or 27c, respectively, of the sealing ring rests, preferably with a close fit to provide sealing abutment. The shank 26b or 27b, respectively, is fixedly connected to the housing 1, so that it can not move axially, the shank 26a or 27a, respectively, being axially movable for sealing cooperation with the axially movable valve components, that is to say with the valve shafts 2 and 3 or the valve bodies 4 and 5.

Figure 6:
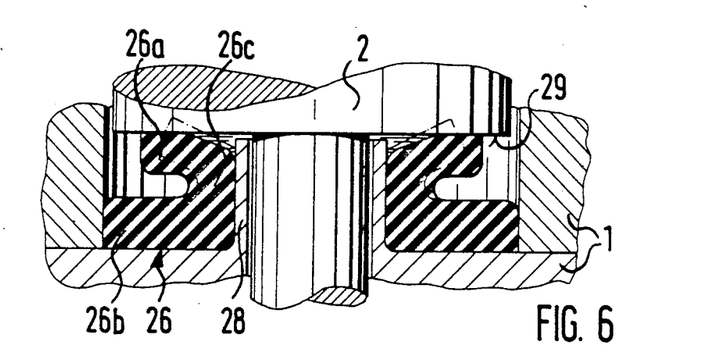
FIG. 6 is an enlarged fragmentary view illustrating details of FIG. 4.

As best seen in FIG. 6, the axially movable shank 26a of the sealing ring 26 (and also the shank 27a of the sealing ring 27) extends obliquely in the unloaded state, as indicated by broken lines, so that when it is initially loaded, it is already under initial stress and seals. To this end, the axially movable shank 26a or 27a, respectively, lies against an annular radial abutment shoulder 29 of the valve shaft 2 or against the reverse side of the valve body 5 (FIG. 4). The respective valve shaft 2 or 3 extends axially with play through the annular supporting collar 28.

Figure 7:
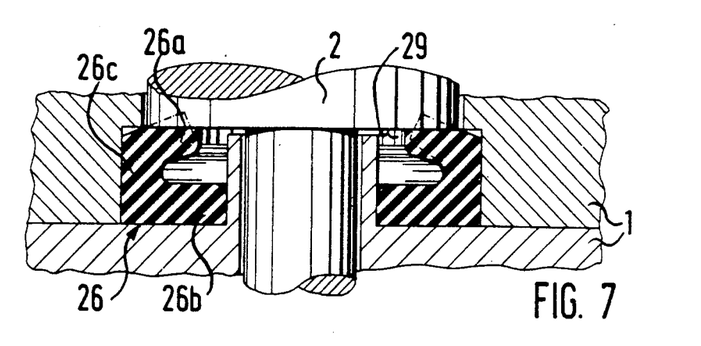
FIG. 7 is an enlarged fragmentary view illustrating a modification of the details shown in FIG. 6.

The seal means shown in FIG. 7 corresponds, with one exception, to that shown in FIG. 6. As shown in FIG. 7, the open side of the sealing ring 26 is directed radially inwards for use where the greater fluid force prevails on the inner side of the sealing ring, so that the fluid flows between the valve shaft 2 and the supporting collar 28.

When the valve shaft 2 and the valve body 5 are moved axially, in particular when as shown in FIG. 5, the valve shaft 2 moves into its open position and the valve body 5 moves into its closure position, the movable shanks 26a and 27a of the sealing rings 26 and 27 move with said shaft and body, respectively, and are urged thereagainst by the fluid pressure so as to perform a sealing function. It will be apparent that there is no friction between the housing 1 on the one hand and the valve shaft 2 or the valve body 5, respectively, on the other hand.

The remaining construction of the valve according to FIGS. 4 to 7 corresponds to that according to FIGS. 1, 2 and 3.

Figure 8:
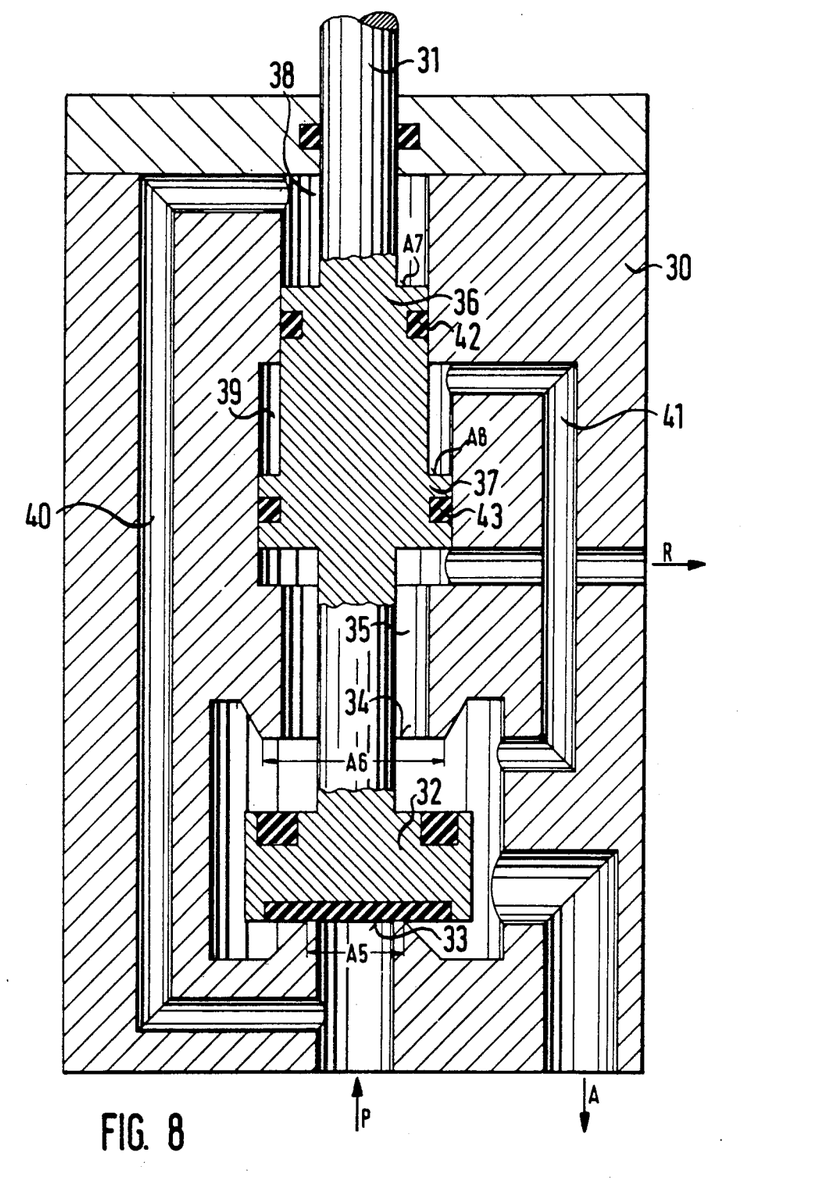
FIG. 8 is an axial sectional view of a lifting valve according to a third embodiment of the invention.

FIG. 8 shows a further embodiment of a lifting valve which is force-balanced in each valve body position, providing increased fluid through-flow performance. A housing 30, has a single valve shaft 31 on one end of which is mounted a single valve body 32 so as to be axially movable, the valve shaft 31 being actuated externally, for example by an electric lifting drive, not shown, approximately in accordance with that described above with reference to FIG. 1. The valve body 32 closes and opens two valve openings 33 and 34 disposed axially opposite to each other, the effective cross-sectional areas of which openings are referenced A5 and A6, respectively. The area A6 is an annular area, because the valve shaft 31 extends therethrough and through the annular chamber 35 adjoining the area A6 and which communicates with an air evacuation conduit R.

The valve shaft 31 further is of multi-stage piston construction, having a first piston 36 and a second piston 37, which are axially movable in chambers 38 and 39. The piston 37 which faces the valve body 32 is of greater diameter than the piston 36. The pistons 36 and 37 each have a force-balancing, annular, compensation area A7 and A8, respectively. Pressure fluid acts upon the areas A7 and A8 in the same direction, that is to say in the direction of the valve body 32. The area A7 is of the same areal size as the area A5, the area A6 being of the same areal size as the sum of the areas A7 and A8.

Pressure fluid enters the chamber 38 and thus acts upon the area 7, by way of a subsidiary channel 40 extending from a conduit P, whereby the area A5 of the valve body 32 which is in its closure position is also acted upon by the pressure fluid. The valve body 32 is accordingly force-balanced and for example, is only held in its closure position by the force of the electromagnetic drive.

When the electromagnetic drive is actuated, the valve body 32 moves into its closure position, opening the valve opening 33, and closing the valve opening 34. Pressure fluid is conducted by way of a further subsidiary channel 41 into the chamber 39 and hence to the compensation area A8. The force of this area balances out the force acting in addition to the force of the area A5, on the valve body 32, so that in turn a balance of force prevails on the valve body 32.

The valve body 32 is also force-balanced in its intermediate positions, because the forces of the areas A5 to A8 as described above act in an identical manner as will be apparent from FIG. 8.

As shown in FIG. 8 conventional 0-ring seals 42 and 43 are arranged in grooves in the pistons 36 and 37. Although such seals may be adequate in some applications, the efficiency of the valve, may be improved by adopting the flat seal construction 17, 19, 20 according to FIG. 3 or the grooved ring seal construction according to FIGS. 6 or 7.

Instead of providing the annular recesses 21 and 22 in the annular grooves 20 and 19 respectively, annular axial projections 21a or respectively 22a may be provided in the said annular grooves. Although FIG. 3 shows only upper ones of these projections, lower projections of this kind are also provided. Instead of the flat sealing ring 17 having radial portions 17a and 17b lying against the abutment shoulders 2a or 1a, respectively, the ring could lie sealingly against said upper and lower projections. Similarly to the recesses 21 and 22, the projections 21a and 22a augment the sealing effect.

As described above with reference to FIGS. 4 to 7, the grooved sealing rings 26 and 27 have their cross-piece members 26c and 27c resting firmly against the respective supporting collars 28, their lower shanks 26b and 27b being immovable. The ring or rings 26 or 27 may, however, lie opposite to the supporting collars 28 with play, so that the upper and lower shanks of each ring can both move axially, so as to be spread apart by the action of the pressure fluid and thereby lie sealingly against the respective abutment shoulders 29.

Figure 9:
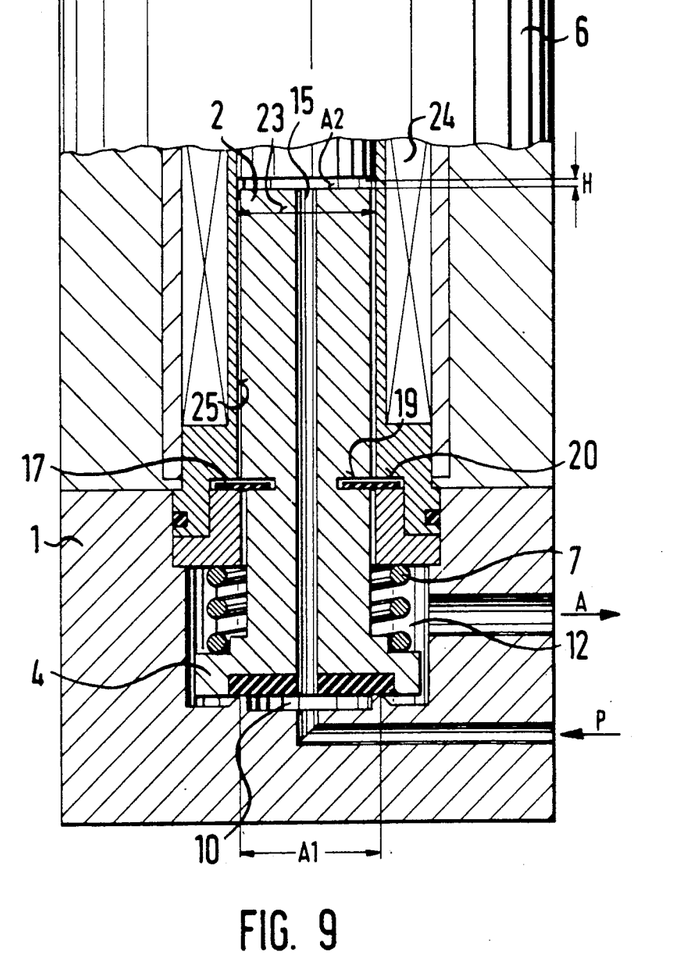
FIG. 9 is an elevational view, shown mainly in axial section, of a lifting valve according to a fourth embodiment of the invention.

A further embodiment of the invention is shown in FIG. 9, in which the same reference numerals designate the same components as described above. In this embodiment the valve body device consists of a single valve body 4 having an associated valve shaft 2 in a single chamber 12. Otherwise, the structure of the valve is identical with that of FIGS. 1 and 2. The valve of FIG. 9 is also force-balanced, there being friction-free sealing between the valve shaft 2 and the housing 1, whereby the seal construction according to FIG. 3, as shown, or that according to FIGS. 6 and 7 may be used. The function of the valve of FIG. 9 is basically identical with that of the valve according to FIGS. 1 and 2. The valve of FIG. 9 also has increased through flow performance in combination with small structural volume and requires a considerably reduced driving power.

The valves described above may be arranged in combination with each other. Thus, several similar valves may be combined with each other, for example several valves according to FIGS. 1, 2 or 8 or 9. Different valves may also be combined with each other, for example one or more valves according to FIGS. 1 and 2 and at least one valve according to FIG. 8 and/or according to FIG. 9, or valves according to FIGS. 8 and 9, or valves according to FIGS. 1 and 9. The valves used in combination are connected with each other as required, by way of internal flow conduits.

The fluid conduits may be interchanged. Thus, for example, in a valve according to FIG. 1, the conduits P and A may be exchanged, so that the action by fluid pressure prevails in conduit A, whereby the conduit P becomes the operating conduit.

What is claimed is:

1. A force-balanced lifting valve for the control of a fluid, said valve comprising:
   a valve housing defining flow paths for the fluid;
   an axially movable valve component comprising shaft means mounted to the valve housing for axial movement therein and a valve body device provided on said shaft means for opening and closing at least one valve opening and having an effective area which is exposed to fluid pressure, said movable component having a forcebalancing compensation area associated with the said effective area;

sealing means for sealing said axially movable component with respect to said housing;

a subsidiary channel for conducting fluid to act upon said compensation area, said shaft means having at least one abutment shoulder and said sealing means comprising an elastic, axially effective sealing ring sealingly engaging the valve housing and said axially movable component, a radial portion of said ring resting axially and sealingly against said at least one abutment, wherein said sealing means comprises an annular flat sealing ring and two opposed annular grooves disposed substantially in a common radial plane, said grooves being formed in said valve shaft and said housing, respectively, said sealing ring extending into said grooves with clearance.

2. A lifting valve as claimed in claim 1, wherein each of said grooves has an open end, an annular recess communicating with each groove proximate to its open end, the recesses being of smaller width radially than the annular flat sealing ring.

3. A lifting valve as claimed in claim 1, wherein said annular grooves are provided with annular, axial projections for augmenting the sealing effect of said sealing means.

4. A force-balanced lifting valve for the control of a fluid, said valve comprising:

a valve housing defining flow paths for the fluid;

axially movable valve components comprising shaft means mounted to the housing for axial movement therein and a valve body device provided on said shaft means for opening and closing two valve openings; and means for sealing said movable valve components with respect to said housing, said housing defining two chambers disposed axially opposite to each other and being in constant communication with each other, the valve body device comprising two valve bodies each disposed in a respective one of said chambers, and spacer means spacing said valve bodies apart from each other, each valve body having an effective area exposed to fluid pressure, a force-balancing compensation area being associated with each of said effective areas, and subsidiary channels being provided for conducting fluid to said compensation areas to act thereupon, said sealing means comprising elastic, axially effective sealing rings engaging the valve housing, said shaft and said valve body device, said shaft and said valve body device each having at least one abutment shoulder upon which rests axially and sealingly against a radial portion of one of said sealing rings.

5. A lifting valve as claimed in claim 4, wherein each valve body has an open and a closure position, said spacer means being disposed by a short distance from one of the valve bodies when one of said bodies is in its closure position and the other of said bodies is in its open position.

6. A force-balanced lifting valve for the control of a fluid, said valve comprising:

a valve housing defining flow paths for the fluid;

at least one axially movable valve component comprising shaft means mounted to the valve housing for axial movement therein and a valve body device provided on said shaft means for opening and closing at least one valve opening and having an effective area which is exposed to fluid pressure, said movable component having a force-balancing compensation area associated with said effective area;

sealing means for sealing said axially movable component with respect to said housing; and a subsidiary channel for conducting fluid to act upon said compensation area, wherein said shaft means and said valve housing each have at least one abutment shoulder, the at least two shoulders extending radially in respect of the axial movement of said shaft means, said sealing means comprising an elastic sealing ring with at least two flat radially extending sealing portions sealingly engaging said valve housing and said axially movable component by resting with its two flat sealing portions axially and sealingly against said at least two radial abutment shoulders, and that the at least two flat sealing portions of said ring are being urged against their associated abutment shoulders by urging pressurized fluid against rear faces of said sealing ring which lie substantially opposite to said sealing faces of said sealing ring.

7. A lifting valve as claimed in claim 6, wherein said sealing means comprises a sealing ring of U-shaped cross-section having two opposite shanks connected by a cross-piece, and having a radially directed open side exposed to high fluid pressure; and an annular, axially projecting, sealing ring supporting collar on the valve housing, through which collar said shaft extends, said cross-piece of the sealing ring being disposed opposite to said collar, and the shanks of the sealing ring sealingly engaging abutment shoulders extending radially of the valve shaft.

8. A lifting valve as claimed in claim 7, wherein said open side is radially inwardly directed.

9. A lifting valve as claimed in claim 7, wherein said open side is radially outwardly directed, and said cross-piece lies against said collar.

10. A lifting valve as claimed in claim 6, wherein said sealing means comprises an annular flat sealing ring and two opposed annular grooves disposed substantially in a common radial plane, said grooves being formed in said valve shaft and said housing, respectively, said sealing ring extending into said grooves with clearance.

11. A lifting valve as claimed in claim 10, wherein each of said grooves has an open end, an annular recess communicating with each groove proximate to its open end, the recesses being of smaller width radially than the annular flat sealing ring.

12. A lifting valve as claimed in claim 10, wherein said annular grooves are provided with annular, axial projections for augmenting the sealing effect of said sealing means.

* * * * *